April 10, 1951 O. J. WAMPOLE ET AL 2,548,573

APPARATUS FOR PROCESSING CONTINUOUS FILM

Filed Dec. 17, 1946 5 Sheets-Sheet 1

Fordyce M. Brown
Clifton M. Tuttle
Oliver J. Wampole
INVENTORS

BY [signature]
[signature]
ATTORNEYS

APPARATUS FOR PROCESSING CONTINUOUS FILM

Filed Dec. 17, 1946 5 Sheets-Sheet 2

Fordyce M. Brown
Clifton M. Tuttle
Oliver J. Wampole
INVENTORS

BY [signature]
[signature]
ATTORNEYS

Fordyce M. Brown
Clifton M. Tuttle
Oliver J. Wampole
INVENTORS
BY
ATTORNEYS

APPARATUS FOR PROCESSING CONTINUOUS FILM

Filed Dec. 17, 1946

Fordyce M. Brown
Clifton M. Tuttle
Oliver J. Wampole
INVENTORS
BY
ATTORNEYS

APPARATUS FOR PROCESSING CONTINUOUS FILM

Fordyce M. Brown
Clifton M. Tuttle
Oliver J. Wampole
INVENTORS
BY [signature]
[signature]
ATTORNEYS Patented Apr. 10, 1951

2,548,573

UNITED STATES PATENT OFFICE 2,548,573

APPARATUS FOR PROCESSING CONTINUOUS FILM

Oliver J. Wampole and Fordyce M. Brown, Rochester, and Clifton M. Tuttle, Huntington Station, N. Y., assignors to Eastman Kodak Company, Rochester, N. Y., a corporation of New Jersey Application December 17, 1946, Serial No. 716,828

16 Claims. (Cl. 95—94)

The present invention relates to photography, and particularly to an improved apparatus for continuously processing an exposed film strip in a rapid and efficient manner.

The object of the present invention is to provide a continuous film processing apparatus for which we claim the following advantages over conventional arrangements:

1. It is faster than conventional arrangements (i. e. continuous tank machines) by a factor of twenty to thirty. (Not in feet per minute but in elapsed time from raw to finished product.)

2. Gamma and density control by the system is simple and positive.

3. Space requirements for an installation are 1/50 to 1/100 of those required by conventional equipment.

4. The results produced are considerably more uniform than those produced by conventional methods.

5. The amount of chemicals used per unit of processed film area is materially less than that of other machines.

6. The film is subjected to much less mechanical deformation than it is in the conventional continuous, rack or tank type processing machines.

7. Because minimum amounts of processing solutions are used, these solutions may be applied to the film hot whereby processing is considerably speeded up. The heating of the solutions is done just prior to their use so that oxidation of the solution is not a factor.

8. Because of the elevated temperatures used, processing time can be shortened to a matter of seconds rather than minutes.

9. Because the film base is not wetted in the process, the film is not affected by mechanical distortions common to other types of machine processing and the drying job is effectively reduced.

10. Because convection currents and diffusion within the developer layer are kept at a minimum, development is exceedingly uniform and the so-called neighbor effects caused by diffusion of exhausted developer to adjacent image areas are minimized.

11. The system is very amenable to photoelectric control because of the accessibility of the film for transmission measurement and because of the manner in which the developing solution is applied to the emulsion surface of the film.

The novel features that we consider characteristic of our invention are set forth with particularity in the appended claims. The invention itself, however, both as to its organization, together with additional objects and advantages thereof, will best be understood from the following description of specific embodiments when read in connection with the accompanying drawings in which, Fig. 1 is a side elevational view of a continuous film processing apparatus constructed in accordance with a preferred embodiment of the present invention, Fig. 2 is an end view, partly in section, of the apparatus of Fig. 1, and showing particularly the construction and mounting of the film supporting roll and the means for driving the same.

Figure 1:
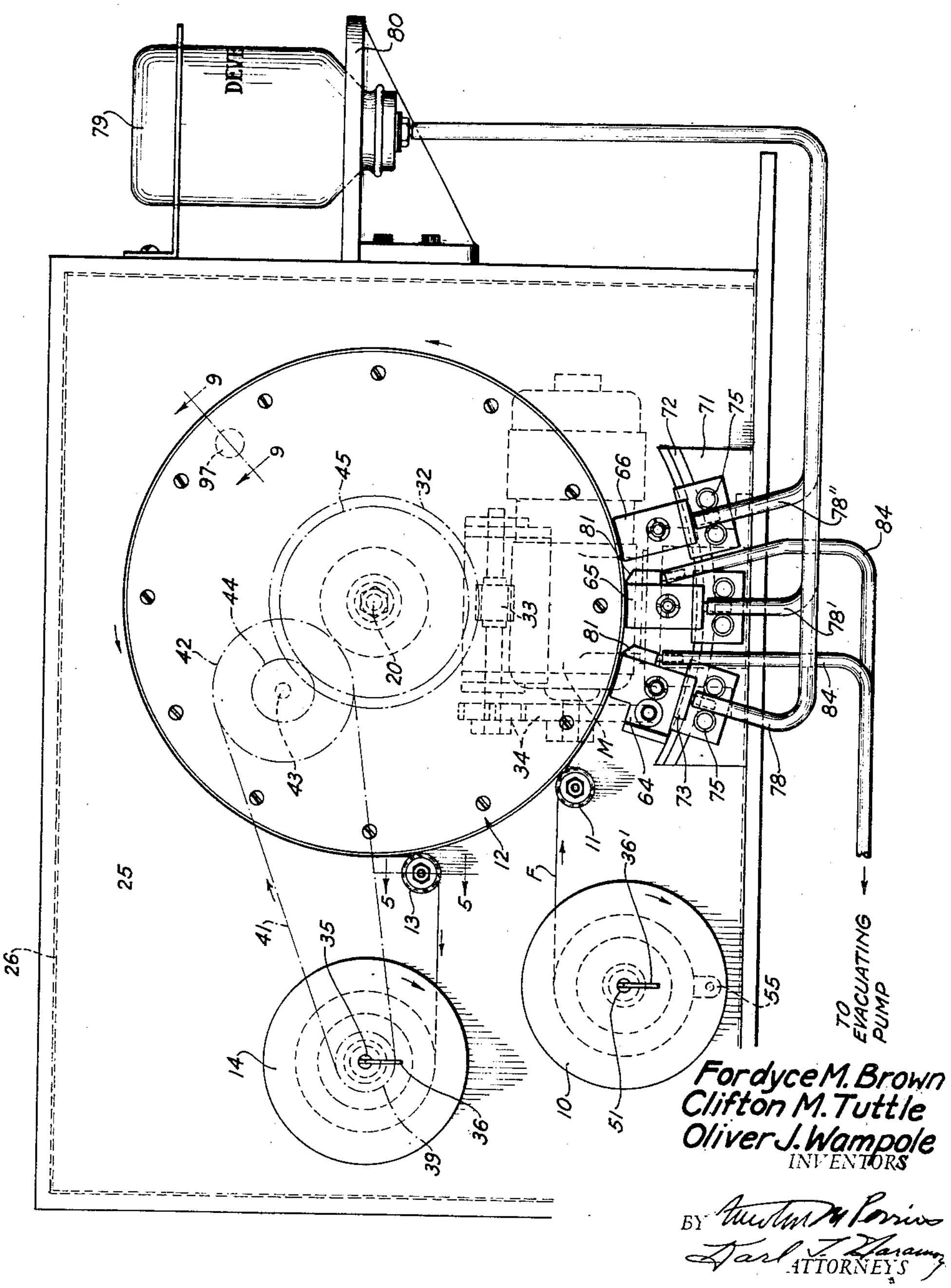
Figure 2:
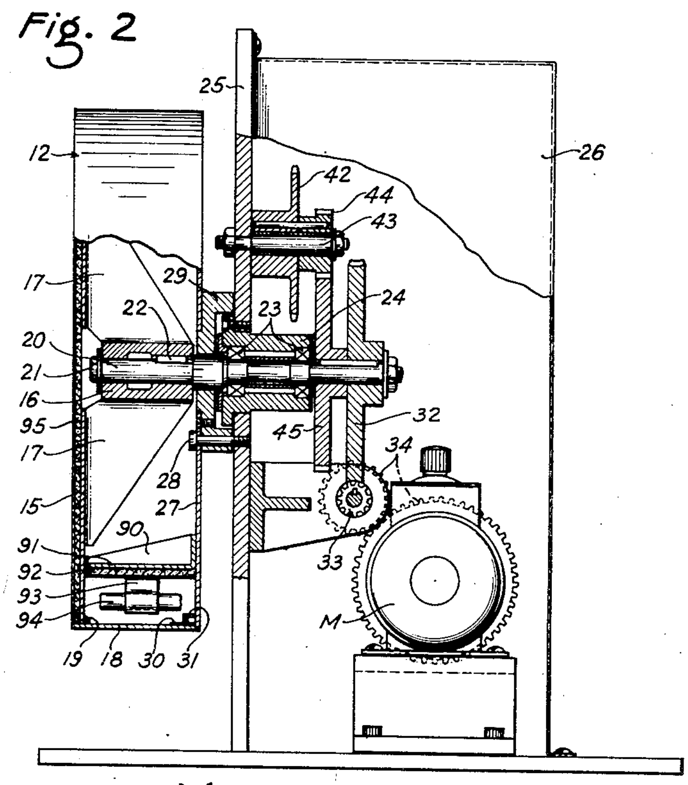
Figures 3, 4, 5:
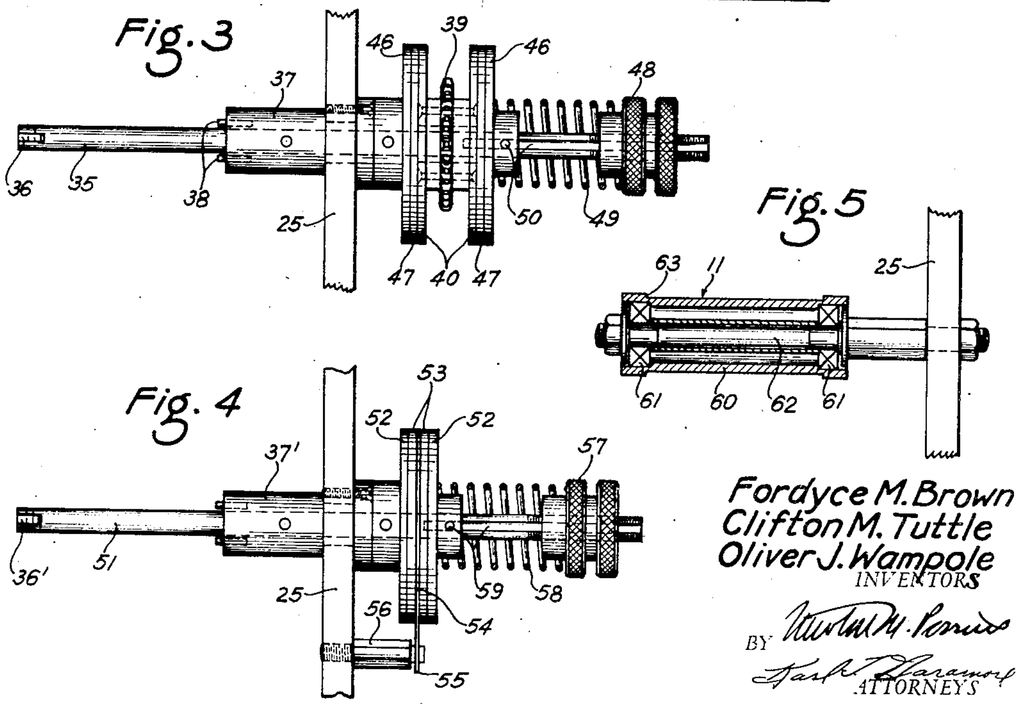

Fig. 3 is an enlarged elevational view of the take-up reel spindle and showing the means for driving the same, Fig. 4 is an enlarged elevational view of the supply reel spindle and showing the means for frictionally retarding the rotation of the same, Fig. 5 is an enlarged sectional view taken on line 5—5 of Fig. 1 and showing the manner in which the guide rollers for holding the film in wrapped relation on the film supporting roll are mounted.

Figures 6, 7, 8, 9:
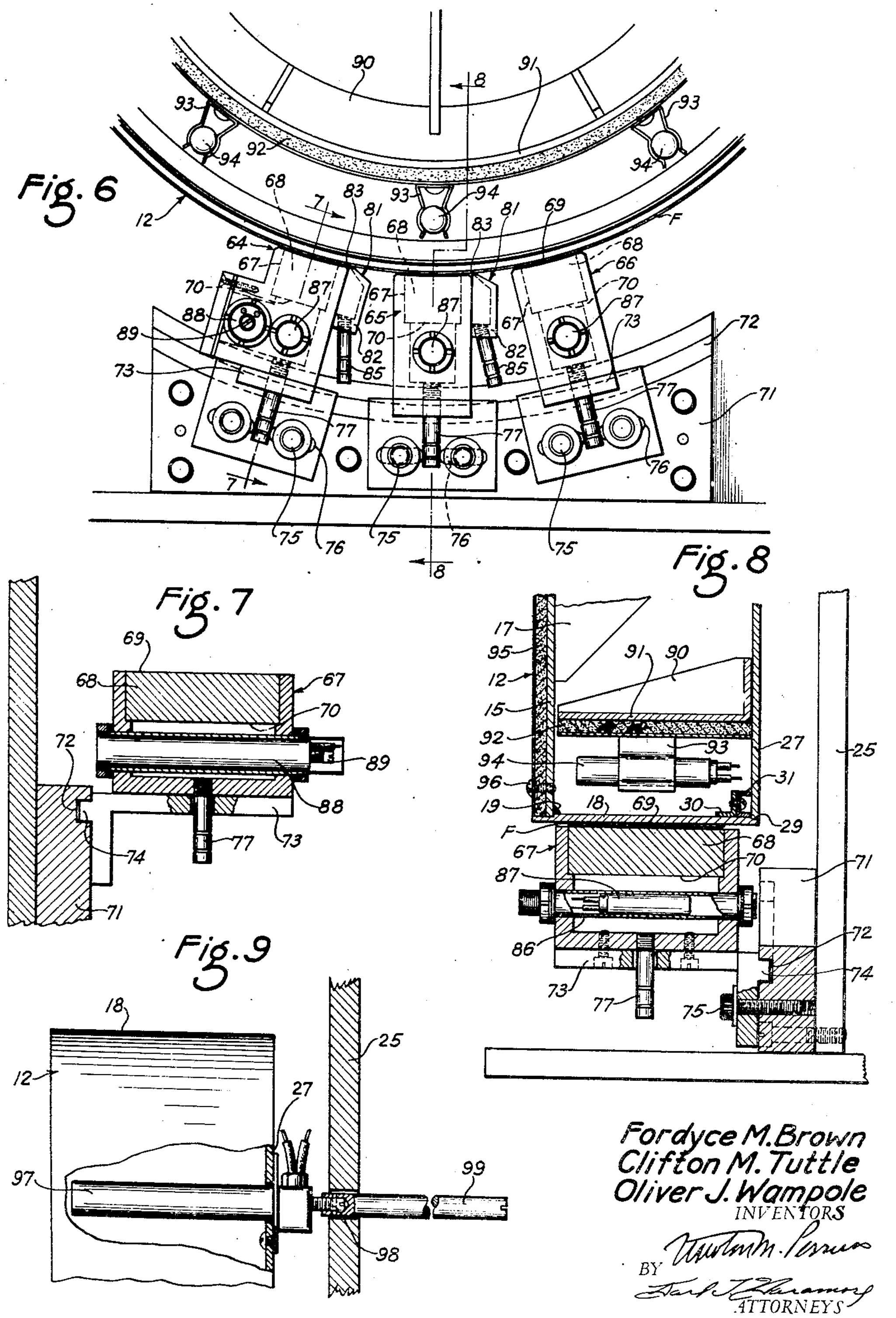
Figures 10, 11, 12:
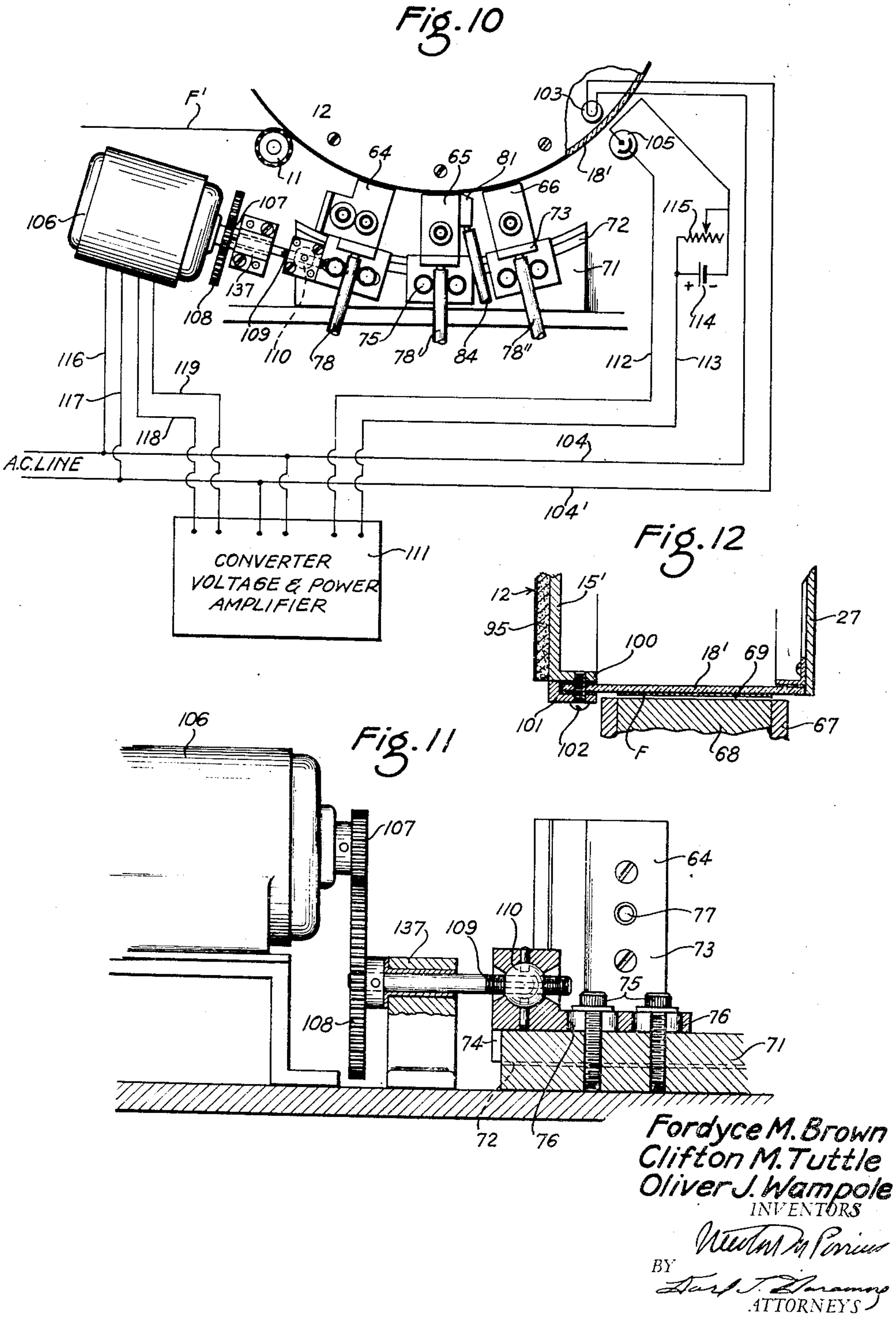
Figures 13, 14, 15:
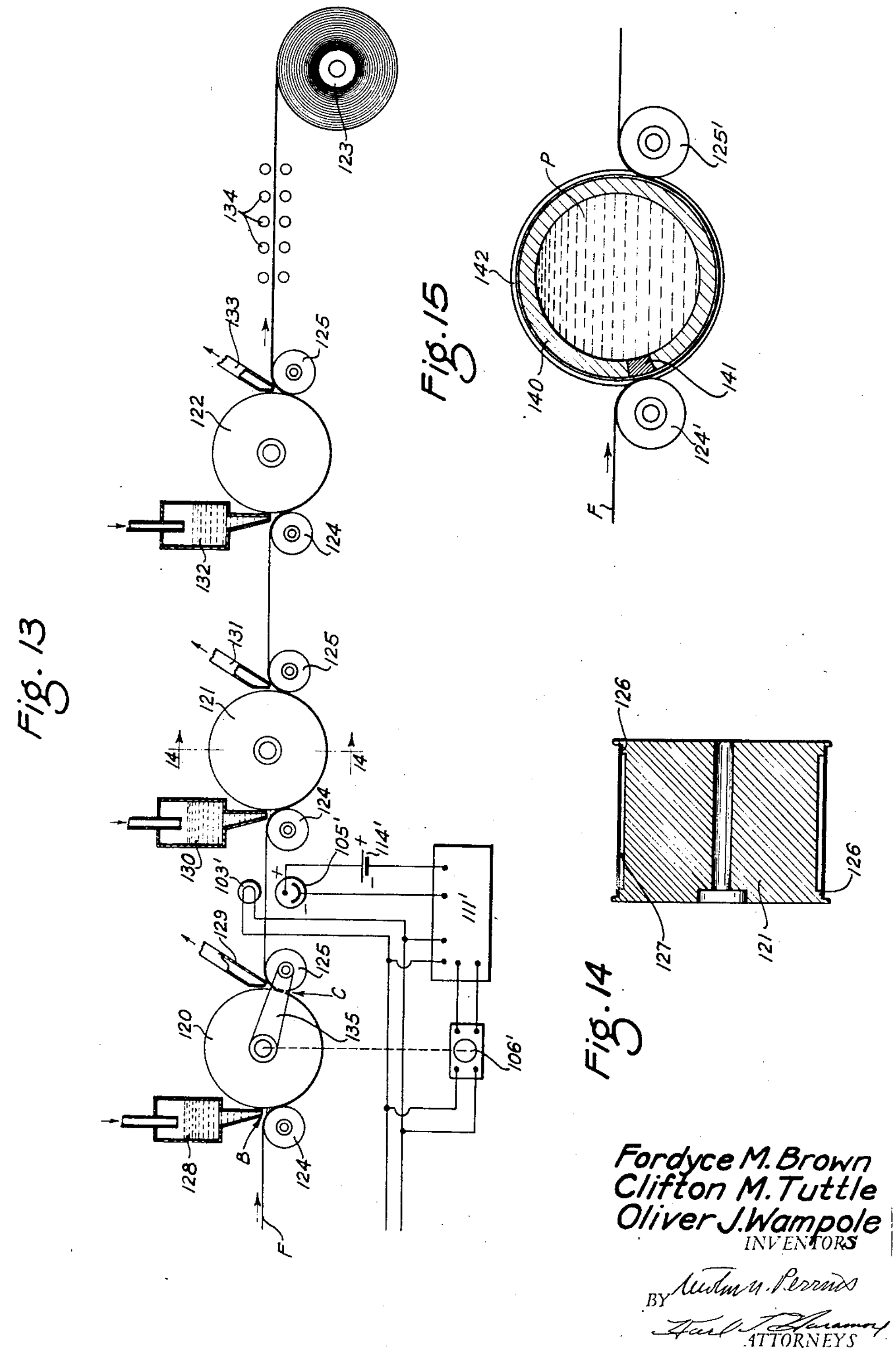

Fig. 6 is an enlarged elevational view of the lower portion of the film supporting roll (with the end cover plate removed) and the associated processing solution application chambers associated therewith, and intended to show the details of said chambers and the manner of mounting the same adjacent the roll surface, Figure 7 is a sectional view taken substantially on line 7—7 of Fig. 6, Fig. 8 is a sectional view taken substantially on line 8—8 of Fig. 6, Fig. 9 is a view taken substantially on line 9—9 of Fig. 1, and showing the thermoswitch mounted within the film supporting roll, Fig. 10 is an elevational view of the lower portion of the machine equipped with a photoelectric control for automatically controlling the developing time to obtain a given film density, Fig. 11 is an enlarged view, partly in section, of a portion of Fig. 10, and showing the manner in which the reversible motor is connected to the adjustable developing solution applicator to adjust the position of the same relative to the periphery of the film supporting roll, Fig. 12 is an enlarged sectional detail showing how the film supporting reel construction could be modified to make the periphery of the wheel transparent as required in the arrangement shown in Fig. 10 having a photoelectric scanning system for the film on the roll, Fig. 13 shows a second embodiment of a continuous film processing machine according to the present invention, and wherein the film strip is successively advanced over separate supporting rolls for the individual processing steps, Fig. 14 is a vertical section taken on line 14—14 of Fig. 13, and showing the form of the periphery of the supporting rolls used in said modification, and Fig. 15 is section showing another modification in the film supporting roll and the manner of applying the processing solution to the film as compared to the arrangement of Figs. 1 and 13.

Like reference characters refer to corresponding parts throughout the drawings.

Briefly, according to the present invention the exposed film is continually fed successively through the several necessary processing stages, and is then completely dried so that it can be taken up directly on a take-up reel. The apparatus is so designed that the processing solutions are only applied to the emulsion surface and in a manner such that the minimum amount of solution per unit of area of film processed is required. Furthermore, the processing solutions are applied to the film in such a way that they can be applied hot without danger of their becoming deteriorated due to oxidation. The use of hot processing solutions makes it possible to cut down on the processing time considerably.

Coming now to the preferred embodiment of the apparatus shown in Figs. 1–9, the exposed film strip F is fed from a supply reel 10, over guide roller 11 and onto the surface of a film supporting roll, indicated generally at 12, with its emulsion side facing outwardly. After travelling in wrapped relation with the major portion of the roll periphery, the film is stripped from the roll over the guide roller 13 and is taken up on the take-up reel 14. While in wrapped relation with the periphery of supporting roll 12, the emulsion surface of the film is subjected to the successive action of the processing solutions necessary to process the film and is completely dried.

The film is advanced at a constant known rate through rotation of the film supporting drum 12 and the rate is determined by the speed at which the film can be processed. We have found that with the arrangement shown, and to be described, a film speed of slightly over 25 inches per minute is possible.

Referring now to Figs. 1, 2 and 8, the construction of the film supporting roll 12 and the drive therefor will be described. For the purposes of heating the periphery of the roll to dry the film, the roll is made hollow and is insulated to confine the heat applied within the roll to the periphery engaged by the film strip. This supporting roll comprises a face plate 15 which is strengthened and connected to a hub 16 by reenforcing ribs 17 which may be welded, or otherwise connected to the two parts. The film supporting periphery of the roll consists of a rim 18, which is slightly wider than the film to be processed, which extends at right angles to the face plate and is welded thereto as shown at 19. The hub 16 of the roll is held on the drive shaft 20 by a nut and washer combination 21 and is connected to said shaft by a key 22.

The drive shaft 20 is supported by roller bearings 23 mounted in a sleeve 24 which is fixed to a vertical supporting wall 25 which forms one wall of a housing 26 inclosing the drive for the roll. The rear open end of the roll is closed by a circular plate 27 which is fixed by bolts 28 to a cap 29 which is in turn fixed to the supporting wall 25 by said bolts 28 or other suitable means. This plate 27 has a diameter slightly less than that of the rim 18, and the periphery thereof fits into a step 29 in the inner edge of the rim to effectively close the drum and prevent heat loss from the interior thereof. To reenforce the inner edge of the rim 18 and to form a bearing surface between the same and the plate 27, there is welded to the inner face of the rim an angle member 30 to which is fastned a channel shaped bearing member 31 the legs of which bear against the inner face of plate 27, see Fig. 8. The bearing member 31 is preferably made of a material which will be non-conductive to heat and have a low coefficient of friction with the material from which the plate 27 is fabricated. The drive for the film supporting roll 12 comprises a reduction gearing including a worm wheel 32 fixed to the shaft 20 which is driven by a worm 33 which is in turn driven by an electric motor M thru a pinion and gear combination 34.

Inasmuch as the film supporting roll is driven at a constant rate of speed, the take-up reel 14 must be driven by an arrangement which will take up the film at proper speed when the reel is empty and will adjust itself as to speed as the reel increases in diameter so as not to put an excessive tension on the film strip leaving the roll. To this end, the take-up spindle 35 is rotatably mounted in the supporting wall 25 and includes the conventional pivoted latch member 36 on its outer end to hold the take-up reel thereon. To obtain the necessary driving connection between the take-up reel and its spindle, we have shown a male clutch member 37 pinned to the spindle, the pair of pins 38 of which are adapted to extend into corresponding openings in the flange of the take-up reel when the reel is slipped onto the spindle.

The drive for the spindle is a friction one, and comprises a sprocket 39 having metal discs 40 pinned to opposite sides thereof and the combination being rotatably mounted on the spindle. This spocket 39 is connected by a chain 41 to another sprocket 42 which is rotatably mounted on a stub shaft 43 fixed to and extending from the inner side of the supporting wall 25. Sprocket 42 is in turn pinned to a pinion 44, also mounted on stub shaft 43, which is in driving engagement with a spur gear 45 keyed to drive shaft 20. As clearly shown in Fig. 3, the friction drive for the take-up spindle from the sprocket 42 includes a pair of metal discs 46 which are pinned or otherwise connected to the spindle to drive the same and between which and discs 40 are disposed friction washers 47, made of any suitable material conducive to an efficient frictional driving condition. So long as the tension on the film strip F being taken-up is below a certain value the drive from the sprocket 39 to the take-up spindle 35 will be positive. However, just as soon as the diameter of the take-up reel increases to the extent that the take-up will tend to wind up the film faster than the roll is feeding it, the friction washers 47 will begin to slip and will slip more and more as the size of the take up roll increases and so that the tension on the film strip will remain substantially constant. The tension on the friction drive can be adjusted by manipulation of nut 48 the position of which alters the tension on coiled spring 49, the right-hand metal disc 46 having a pin and slot connection 50 with the spindle.

Coming now to the supply reel, this reel must have a hold back arrangement of some sort to keep the film strip from running free therefrom and to account for changes in diameter of the reel as the film is wound off. To this end, the supply spindle 51 is rotatably mounted in the supporting wall 25 and has a latch 36′ and a male clutch member 37′ like that on the take-up spindle to hold the supply reel in driving engagement with the spindle. The end of the spindle extending from the inner face of wall 25 is provided with a friction hold back arrangement comprising a pair of metal discs 52 pinned to the spindle and having sandwiched there-between a pair of friction washers 53, rotatably mounted on the spindle. Disposed between said friction washers, and fastened to one or both thereof, or free from each, is a spacer member 54 having an ear 55 which is connected to a stud 56 threaded into the wall 25. The degree of hold back friction can be adjusted by a nut 57 threaded onto the supply spindle and serving to adjust the tension in the coil spring 58 bearing on the right hand metal disc 52 which is connected to the spindle by a pin and slot connection 59.

The guide roller 11 and the stripping roll 13 are identical in construction and mounting, and the showing of Fig. 5 is representative of each. Each of these members comprises a cylindrical shell 60 which is rotatably supported on bearings 61 held in spaced relation on a stub shaft 62 fixed to and extending from supporting wall 25. The periphery of the sleeve is provided with a groove 63 substantially the width of the film being processed so that these members serve to direct the film accurately onto, and off of, the periphery of the film supporting roll 12.

Having described the means for advancing the film strip from a source of supply to a source of take-up at a constant rate of speed, and supporting the same in a flat condition during such travel, we will now proceed to describe the means for processing the film while it is carried by said film supporting roll 12. As shown in Fig. 1, the developing solution, the fixing solution, and the wash water are successively applied to the emulsion surface of the film while the latter is supported on roll 12, from a developer applicator, a fixing solution applicator, and a wash water applicator indicated broadly as 64, 65 and 66, respectively. Inasmuch as each of these applicators is the same in both function and construction only one of the same will be described in detail and corresponding parts of each will be indicated by the same reference characters.

Referring now particularly to Figs. 6, 7 and 8, each of the liquid applicators comprises an open-ended chamber 67 made of metal or other material, which is inert to the liquid to be handled thereby. Mounted in, and closing, the open end of each chamber is a block of porous material 68 the front face 69 of the block lying substantially flush with the mouth of the chamber while the rear face 70 of the block is open to the interior of the chamber. The porosity of each block 68 is such that the processing solutions to be used when fed into the chambers will filter therethrough and be dispersed uniformly over the front face of the block. We have found that blocks suitable for this purpose can be made from sintered metal or carbon.

The open end of each chamber and the front face of the porous block therein is arcuate in shape to conform to the periphery of the supporting roll, and is mounted adjacent the roll surface so that the face of each block is spaced but a few thousandths of an inch from the emulsion surface of the film on the roll to form, in combination with the moving film surface, a restricted passage which is to be constantly filled with the processing solution emerging from the face of the block. In order to mount the applicators so that they can be adjusted relative to one another around the surface of the wheel to vary the processing time, and/or facilitate removal of each for cleaning, or other purposes, the following mounting structure is provided. Fixed to the vertical supporting wall 25 is a supporting block 71 having an arcuate guide slot 72 in the exposed face thereof which is concentric with the periphery of the film supporting roll. Attached to the bottom of each chamber 67 is the horizontal arm of an L-shaped bracket 73 while the vertical arm of the bracket includes a tongue 74 extending into the arcuate guide slot. This bracket with its chamber is adjustably mounted on the face of the supporting block 71 by a pair of bolts 75 which extend thru arcuate slots 76 in the vertical arm of the bracket to permit adjustment of each chamber around the periphery of the film supporting roll 12.

The bottom of each chamber is provided with a port 77 to which a hose 78 connected to a supply of processing solution is connected to feed the solution into the chamber under pressure. Rather than complicate the apparatus with a pumping device we have found that the solutions will be fed to the chambers with sufficient pressure to cause the solutions to filter thru the blocks 68 if the solutions are contained in bottles 79 mounted in brackets 80 on a wall of the apparatus and above the top of the applicators so that the solutions are fed to the chambers by gravity. Although only one bottle 79 is shown, that containing the developer, there will be another containing fixing solution and a third carrying water. The hose 78 conducts the developing solution to the applicator 64, while hoses 78′ and 78″ will conduct fixing solution and water from bottles, not shown, to applicators 65 and 66, respectively.

Looking at Fig. 8 it will be seen that the processing solutions emerging from the face of the porous blocks 68 forms a shallow uniform pool of solution which the emulsion surface of the film moves through as it passes each applicator so that the emulsion surface of the film is uniformly treated. The film necessarily carries the solution from each passage as it moves along and the feed of the solutions to the chambers is regulated to just make up for that solution carried away by the film and to thereby maintain the passages full. This arrangement results in the solutions in each restricted passage being continually changed so that each new area of film reaching the passages is treated with a full strength, and non-deteriorated solution. Furthermore, the uniformly dispersed application of the solutions to the passages which is afforded by the porous blocks insures that the entire area of the film strip is uniformly treated.

In order to prevent the developing solution and the fixing solution from being carried by the film into the passage formed between the fixer and water applicators and the film, respectively, and tending to pollute the solutions applied at these points, means may be provided for evacuating all superfluous liquid from the surface of the film as it leaves each passage. As clearly shown in Figs. 1 and 6, such an evacuating means may comprise a nozzle 81 formed by fixing a three sided housing 82 to the right hand wall of the developer and/or fixer chamber 67, and cutting away the upper corner of the wall to form a restricted narrow opening 83 extending across the width of the film strip on the roll. The evacuating nozzle 81 can be evacuated by means of an evacuating pump (not shown) to which it is connected by a hose 84 fastened at one end to a port 85 on the bottom of the housing 82, and the film surface will be cleared of free liquid before it reaches the succeeding processing solution applicator. We have found that it is not necessary to remove the free developing solution from the surface of the film before it reaches the fixer applicator. On the contrary, the film carrying the free developing solution may be fed into the fixer applicator directly, the fixing solution being relied upon to stop the action of the developer as well as fix the film. One advantage of this arrangement is that the spacing between the developer applicator and the fixer applicator can be used to govern the developing time to which the film is subjected, and the spacing relation between these two applicators can be adjusted to readily and effectively vary the developing time to obtain desired densities in the finished film and correct for inaccurate exposures.

The present arrangement of parts, and particularly the method of applying the processing solutions to the film in the minimum amounts necessary to adequate processing, makes possible the use of hot processing solutions which considerably speeds up the processing time. It has been appreciated in the film processing art that the hotter the processing solutions are when used the faster the film is processed thereby. One limitation to the use of hot processing solutions in the past has been the lack of a film support and an emulsion which would stand the heat. This limitation has been eliminated recently in the discovery of a film support and emulsion which will stand elevated temperatures for limited times. A second limitation to the use of elevated temperatures of processing solutions has been that the processing solutions oxidize rapidly when held at elevated temperatures for any appreciable time and hence deteriorate to a point where they lose their chemical action. The present apparatus removes this last limitation, because it is possible to elevate the processing solutions just prior to their use, and it is not necessary to maintain the solution hot for a time sufficient to allow oxidation to become a factor.

Referring now to Figs. 1, 6, 7 and 8, in each chamber 67, between the rear face of the porous block 68 and the bottom of the chamber, is mounted a sleeve 86 of heat conducting material and within which is seated an electric resistance heater element 87. This portion of the chamber will be filled with processing solution, and the solution will be heated by the heater element as it passes thereover on its way from the port to the rear face of the porous block. We have found that very efficient and rapid processing results if this heater heats the processing solution to about 160° F. To maintain the temperature of the processing solutions constant and at a known value, the developing chamber 64 is provided with an offset position which increases its capacity to a small extent and by an amount sufficient to receive a standard type thermo switch 88, see Fig. 7, which is connected into the circuit of the heater elements to control the circuit thereof. As is well known, this thermo switch is sensitive to temperature and serves to break an electric circuit when a predetermined temperature, for which it is set, is exceeded. The thermo switch 88 can be adjusted by manipulation of an adjusting screw 89 which is left accessible, as shown, for adjustment by a screw driver. While each solution applicator could have its own thermo switch, we have found that satisfactory results are obtained if each of the solutions are maintained at the same temperature, and for this reason only one thermo switch is needed for the three applicators. The temperature of the developing solution is used for control purposes, since the developing time is the most critical of the processing steps and the one which must be accurately controlled.

Having described how the film is processed by moving on the roll 12 past the developer, fixer and wash water applicators 64, 65 and 66, respectively in succession, the only problem remaining is to dry the processed film strip prior to the time it reaches the take-up reel 14. While this can be accomplished in a number of ways, including passing the film past radiant heaters located around the outside of the roll, using an electro-static high frequency heater, etc., we have found that very good results can be obtained with the arrangement shown and now to be described.

Referring now to Figs. 2, 6 and 8, fixed to the inside wall of the stationary circular plate 27 in endwise relation are a plurality of arcuate supporting brackets 90 the free horizontal arms 91 of which extend parallel to the rim 18 of the film supporting roll and form a circular supporting member concentric with the rim. Fixed to the outside face of circular supporting member formed by said brackets is a band of insulating material 92 faced with a sheet of metal, or other suitable material, at spaced points on which there are attached spring clips 93 for holding electric resistance heating elements 94 in parallel and spaced relation to the inside surface of the rim 18. These heaters are all electrically connected to a suitable source of potential not shown, and serve to heat the space behind the rim 18 of the film supporting roll and enclosed by the band 92 of insulating material, the stationary plate 27 and the face plate 15 of the roll. To further restrict the loss of heat from the interior of the roll 12, the face plate 15 is covered by a sheet 95 of insulating material which is fastened to the outside of the face plate by any suitable means such as bolts 96. Therefore, as the film supporting roll rotates around the heater elements 94 the rim 18 thereof is heated up and the heat transmitted therefrom to the support side of the film serves to dry the film prior to the time it leaves the surface of the roll. The temperature of the rim 18 of the roll is raised as high as the film will stand without damaging results in order to insure complete drying of the film prior to its leaving the roll, and the temperature of the rim is maintained constant by means of a conventional thermo switch, shown at 97 in Figs. 1 and 9, which is connected in circuit with the heater elements 94. As shown, this thermo switch 97 is mounted on the stationary plate 27 to extend into the interior of the roll between the rim 18 and the insulating band 92 to measure the temperature of the space which controls the heating of the rim. To permit desirable adjustment of the thermo switch 97 in the present apparatus, the customary adjusting screw 98 thereof has pinned thereto an extension member 99 which extends through the vertical supporting wall 25 where it is accessible for adjustment by a screw driver in the usual way.

The present apparatus is readily amenable to a photo-electric control for automatically varying the development time of the film strip to obtain a constant optical density in the processed film strip. In Figs. 10, 11 and 12, we have shown the apparatus previously described modified to incorporate such a photoelectric control.

As before, exposed film strip F is fed from a supply source, not shown, over the guide roller 11 and onto the periphery of the roll 12 with its emulsion side facing outwardly. While on the roll the film strip is moved past the developer applicator 64, the fixer applicator 65 and the fixer neutralizer applicator 66 in succession for purposes of processing the emulsion surface, and is then dried on the roll, which is heated as before, before being taken up on a take-up reel, not shown.

In order to be able to control the density of the film strip to maintain it at a given value, the density of the strip must first be measured. In order to do this conveniently while the film is maintained on the rim of the roll 12, we propose making the rim 18′ of the roll from a transparent material which will also conduct heat for purposes of drying the film. Glass is one material which serves this purpose very well. In Fig. 12 we have shown how a glass rim might be satisfactorily mounted on the roll. The glass is first formed into a cylinder of the desired diameter. The outer edge of the face plate 15′ of the roll 12 is provided with a flange 100 in clamped relation with which one edge of the glass rim 18′ is held by a clamp member 101, the three pieces being joined by bolts 102 passing through the clamp member and rim and into threaded engagement with a tapped hole in the flange.

Referring back to Fig. 10, at a point on the film supporting roll 12 beyond, but adjacent, the last applicator 66 is mounted within the roll, and adjacent the transparent rim 18′, a lamp 103 of constant and known intensity which is connected to a source of potential, not shown, by leads 104 and 104′. The rays from the lamp after passing through the rim 18′ and the processed film F′ carried thereby strikes the cathode of a photoelectric cell 105, which is preferably of the photovoltaic type. With this arrangement the processed film strip is continuously photoelectrically scanned, and the output of the photocell 105 will give an indication of the density of the film.

Deviations of the density of the processed film from a constant value can be readily corrected by varying the development time of the film. This can be done in one of two ways depending upon the way in which the development of the film is handled. If an evacuating nozzle 81 is used behind the developer applicator as shown in the embodiment already described, then the development time can be altered by making the nozzle separate from the applicator chamber and providing for its adjustment relative thereto along the film path. The second way of varying the development time of the film, and the one which we have shown herein, is concerned with an arrangement where no evacuating nozzle is used at the leaving side of the developer applicator but the developing solution is left on the surface of the film to be washed off and neutralized by the fixing solution applied at the applicator 65. Then in order to vary the development time of the film it is only necessary to adjust the developer applicator 64 towards and from the fixer applicator. The mounting means for the developer applicator already described is readily adapted to such adjustment, and as shown in Fig. 11 it is only necessary to leave the bolts 75 of the developer applicator 64 slightly loosened to permit the tongue 74 to slide in the arcuate guide slot 72.

The adjustment of the developer applicator toward and from the fixer applicator is accomplished by operation of a reversible electric motor 106 connected by gears 107 and 108 to a screw 109 which is in threaded engagement with a nut 110 carried by the developer applicator. The nut 110 is connected to the applicator 64 by a universal type joint as shown in order to permit the applicator to move in an arcuate path when adjusted while the screw 109 is fixed in a bearing support 137 against movement transversely of its axis. All that is necessary now is to provide a control which will leave the motor 106 deenergized so long as the density of the processed film is equal to a chosen value but cause the motor to start when the film density deviates from said value and choose the direction of drive of the motor which will cause an adjustment of the developer applicator 64 in the proper direction to correct for the density deviation and bring it back to the standard value. For instance if the film density is too great, the motor must drive in a direction to move the applicator 64 toward the applicator 65 to cut down the development time of the film, and vice versa if the film density decreases from the standard value.

This could be accomplished by a galvanometer which would be fed by the output of the photocell 105 and the pointer of which would control a reversing switch for the motor 106. In such an arrangement, the galvanometer pointer would leave the motor circuit open when the cell output was indicative of a standard film density, but would close one of the circuits of field windings of the motor when the galvanometer pointer fell below the neutral point, and close the circuit of the other field winding of the motor when the galvanometer pointer went above the neutral point.

However, since controls of this type using galvanometers are quite delicate and unduly effected by vibration, for purposes of disclosure we have chosen to show the use of a continuous balance control system which is available from the Brown Instrument Company for serving this control job. Inasmuch as this control system per se forms no part of the present invention, and is available on the open market and is described in publications including U. S. Patent 2,300,742 issued November 3, 1942, and the Technical Journal entitled "Instrumentation," (Instrument Technology) vol. 1, No. 1, 1943, pp. 9–12 inclusive, we have shown it only diagrammatically and will describe it functionally. This control unit as purchased includes the reversible motor 106 which is called the balancing motor and a unit 111 including a converter, and voltage and power amplifiers. The unit 111 operates on the null system so that connected in series in bucking relation in the input lines 112 and 113 are the photocell 105 and a standard potential 114. The standard potential represents the output which would be derived from the photocell 105 if the film had the standard or chosen density, and a variable resistance 115 is connected into the input circuit so that this standard can be adjusted as desired. The balancing or reversible motor 106 is a two-phase reversible induction motor and one phase thereof is connected by leads 116 and 117 to an A. C. source while the other phase thereof is connected by leads 118 and 119 to the output of the power amplifier of unit 111.

Now if the density of the film being measured is equal to the chosen standard then the output of photocell 105 will balance that of the standard potential 114 and no current will flow in the input circuit to unit 111. Consequently, the motor 106 will remain idle and the developer applicator 64 will remain where it is. Now if the density of the film should vary from the standard value, the output of the photocell 105 will rise or fall with respect to the standard potential and a current will flow in one direction in the input circuit to unit 111 if the film is too dense and in the other direction if the film is not dense enough. This input D. C. current is then converted to an alternating voltage of proportional magnitude by the converter of unit 111 and the alternating signal from the converter is increased in amplitude and power by the amplifiers of unit 111 while maintaining its timing relationship with the A. C. supply voltage to one phase of the motor to provide the proper direction of rotation of the balancing motor. Thus, if the current flows in a direction in the input circuit to unit 111 in a direction indicating the film is too dense then the motor will drive in a direction to move the applicator 64 toward applicator 65 to cut down the developing time, and the motor will continue to drive until a balance in the input circuit is obtained. The reverse would be true if the current flowed in the input circuit in the other direction.

In Figs. 13 and 14 we have shown diagrammatically another modification of the present invention wherein the film strip to be processed is successively passed over a plurality of spaced rollers for the different processing steps rather than having the processing done while the film is supported on a single roll. As shown, the exposed film strip F is fed emulsion-side up in the direction of the arrow from any source of supply over each of rollers 120, 121 and 122 in succession, and then to a take-up reel 123. The film strip is held in wrapped relation with each of rollers 120, 121 and 122 by a pair of guide rollers 124 and 125, the latter of each pair being more accurately referred to as the stripping roller since it determines the position on the roller at which the film strip is stripped therefrom.

As shown in Fig. 14, the periphery of each of the rollers 120, 121 and 122 is flanged for guiding the film edgewise and undercut so that the film is supported only at the edges on shoulders 126 and the major or exposed portion of the emulsion surface of the film is spaced from the bottom of a groove 127. The construction provides a flat channel .003 to .005 inch deep that is closed as the film comes into contact with the shoulders. Into this channel at point B, a flat jet of developing solution pours from supply chamber 128 between the emulsion and roller surface. As the roller rotates, a thin layer of developer is drawn around the roller to the point C where the film is stripped from the roller by stripping roller 125 and the excess developer is removed from the film surface by the suction nozzle 129 connected to an evacuating pump, not shown.

Similar mechanical functions are performed by rollers 121 and 122. At rollers 121, a fixing solution is supplied to the channel between the film surface and the groove in the roller from a supply chamber 130, and as the roller rotates a thin layer of fixing solution is drawn around the roller to the point where the film is stripped off over guide roller 125. At this point the excess fixing solution is removed from the film surface by the suction nozzle 131, and from which the film strip moves to roller 122 where it is washed with water or a fixer neutralizer solution pouring from a supply chamber 132 into the channel formed between the film surface and the groove in the roller and carried in a thin layer around the roller to the stripping point. After the excess water is removed from the film surface by a suction nozzle 133 the film strip moves through any suitable drying means 134, which may be a bank of infrared lamps or a high frequency electrostatic heating means and then to the take-up reel 123. For advancing the film strip at a constant rate, each of the rollers 120, 121 and 122 is driven from the same constant speed motor, not shown, and the take-up reel 123 is driven by a friction drive takeup similar to the described in connection with the first embodiment and not shown in Fig. 13.

In this modification, as in that first described, the film is processed by applying a minimum amount of processing solution to only the emulsion surface of the film in a manner that insures each area of film being treated with a fresh supply of processing solution which is applied uniformly over the entire area of the film and kept agitated by the movement of the film itself. In both instances, because convection currents and diffusion within the developer layer are kept at a minimum, development is exceedingly uniform and the so-called neighbor effects caused by diffusion of exhausted developer to adjacent image areas are minimized. Furthermore, since only the emulsion surface of the film is wetted, the drying problem is eased to make it possible to completely dry the film in a short time to allow it to be taken up directly on a reel.

If it is desired to use hot processing solutions with this arrangement without danger of the solutions suffering deterioration due to oxidation, this can be accomplished by having the supply chambers 128 and 129 fed by gravity from large supply vats, not shown, and making the chambers 128 and 129 of such capacity that the solutions fed to the rollers 120 and 121 essentially pass continuously therethrough. Then these chambers 128 and 129 could include thermostatically controlled electric heaters of the type shown and described above so that the developer and fixer would be heated up just prior to application to the film surface.

In this embodiment, the development time of the film can be readily altered by shifting the position of the stripping roller 125 adjacent the developer roll 120 to vary the degree of wrap of the film with this roller, whereby the time for which the developing solution is confined to the film surface can be varied. As a means of accomplishing this, we have shown the stripping roller 125 adjacent the developer roller 120 carried by a yoke 135 pivoted on the axis of the roller 120 for rotation independently of said roller.

For photoelectrically controlling the density of the processed film in a continuous manner, a continuous balance control of the type described in connection with the embodiment shown in Fig. 10 could be used to position the stripping roll 125 relative to the developer roll 120 in response to density measurements continuously made of the film by a photoelectric scanning system. To this end a photovoltaic type photo cell 105′ would scan the light from a lamp 103′ as it passes through the moving film just as it leaves the developer roller 120, and this cell is connected in a closed loop circuit in bucking relation to a standard potential 114′ whose output corresponds to the standard density desired in processed film. The output of this measuring circuit is then fed into the amplifier unit 111′ of "Brown Continuous Balance Control" of the type described above, and which control includes a reversible balancing motor 106′. As diagrammatically shown, the reversible motor 106′ is connected to the yoke 135 carrying the stripping roll 125 to drive the same in opposite directions around the developer roller 120 to change the developing time of the film. Now then, so long as the density of the film is equal to the selected standard, there will be no current flowing in the measuring circuit and the motor 106′ would remain still. However, if the film density varies from said standard value, a current will be developed in the measuring circuit, and depending upon its direction of flow, the motor 106′ will be energized to drive in the proper direction to adjust the position of the stripping roller 125 so as to change the developing time of the film in the proper sense to correct said measured discrepancy in density and to an extent to bring the film density back to the standard value.

While the film density measured immediately after the film is developed and before it is fixed will not be the same as the final density the fully processed film will have, the density of the film at this point will be a function of the final density and can be satisfactorily used for control purposes. The obvious advantage of measuring the film density at this point rather than after it is fully processed is that a more immediate control of the film density is obtained with the result that there is less chance of substantial lengths of film leaving the apparatus with a density varying from the standard value.

In Fig. 15 we have shown a modified form of solution applicator that may be substituted for that just described and which follows the principle of the applicators used in the embodiment shown in Fig. 1. In this modification, the processing solution P is fed under pressure to the inside of a drum 140 and it passes through a porous block 141, formed of sintered metal, carbon, glass, etc., which forms a portion of the periphery of the drum. The drum is stationary, and the edges of the film strip F ride on idler flanged rollers 142 at the ends of the drum. These rollers are of slightly larger diameter than the drum and thus keep the film, held in wrapped relation therewith by guide rollers 124′ and 125′, from making contact with the drum. As in the arrangement shown in Figs. 13 and 14, a restricted channel about 0.003 to 0.005 of an inch deep is maintained between the emulsion surface of the film and the surface of the drum containing said porous block, and this channel is maintained full of processing solution due to the uniform seepage thereof from the interior of the drum through the porous block.

From the above description of our invention it will be readily apparent to those skilled in the art that we have provided a continuous film processing apparatus possessing the many advantages set forth at the beginning of the specification. The manner in which the processing solutions are applied to the emulsion surface of the film insures that each area of film is subjected to fresh processing solution and diffusion of exhausted processing solutions to adjacent image areas is minimized with the result that so-called neighbor effects, caused by such diffusion and prevalent in conventional apparatus, is practically eliminated. The method of applying the processing solutions is also conducive to the practical use of elevated temperatures thereof, as well as the use of minimum amounts of the solutions.

Although we have shown and described certain specific embodiments of our invention, we are fully aware that many modifications thereof are possible. Our invention, therefore, is not to be limited to the precise details of construction shown and described but is intended to cover all modifications coming within the scope of the appended claims.

Having thus described our invention, what we claim is new and desire to secure by Letters Patent of the United States is:

1. A continuous film processing machine comprising in combination movable means for supporting a film strip flatwise with the exposed portion of its emulsion surface free from surface contact therewith; a plurality of stationary partitions spaced from one another along the film path, and each partition being adjacent and concentric to a portion of the length of said film supporting means and slightly spaced from the emulsion surface of the film thereon to form relatively narrow passages in combination therewith; means for continually supplying a quantity of developing solution into the passage formed between the emulsion surface of the film and the first of said partitions, means for continually supplying a quantity of fixing solution into a succeeding passage formed between the surface of the film and another of said partitions; means for moving said film supporting means at a constant known rate to advance the film through said processing solutions; and means for removing the superfluous developing and fixing solutions from the surface of said film immediately upon the film leaving each of said passages.

2. A continuous film processing machine comprising in combination a rotatable drum; means for feeding a film strip onto the periphery of said drum and holding it in wrapped relation with a portion of the periphery thereof and with the emulsion facing outwardly; means for leading the film from said drum; means for rotating said drum at a constant rate to advance the film through different stages of processing; means for successively applying different processing solutions to the emulsion surface of the film while it is supported on said drum; said means comprising a plurality of open-ended chambers displaced from one another around that portion of the drum supporting the film strip and stationary relative to said drum, the open end of each chamber closed by a block of porous material having an arcuate front face concentric with, and slightly spaced from, the emulsion surface of the film, and forming with said film surface a restricted narrow passage; the rear face of said block communicating with the interior of the chamber in which it is mounted; and means for continually supplying processing solutions to each of said chambers under pressure, whereby said solutions filter through said blocks and are uniformly dispersed from the front face thereof to keep said restricted passages filled with constantly renewed solutions.

3. A film processing machine, according to claim 2, and including means adjacent the leaving edge of each chamber for removing the free processing solution from the surface of the film as it leaves said chamber.

4. A film processing machine, according to claim 2, and including a nozzle located at the leaving edge of at least one of said chambers with its mouth slightly spaced from the film surface; and a pressure reducing means connected with said nozzle to create a suction in said nozzle to remove the free liquid from the surface of the film as it leaves the restricted passage formed between said chamber and the film surface.

5. A film processing machine, according to claim 2, and including means in each of said chambers for heating the processing solutions to a given temperature immediately prior to its introduction into the restricted passage, whereby the desired chemical action of the solution is not reduced due to sustained heating prior to use.

6. A film processing machine, according to claim 2, in which the solution applied to the film at the first chamber is a developing solution and that applied at the second chamber is a fixing solution, and in which one of said first two chambers is adjustable around said drum toward and from the other to vary the developing time to which the film is subjected; and means for adjusting said adjustable chamber relative to the other in accordance with the optical density of the processed film to obtain a processed film having a constant density.

7. A film processing machine, according to claim 2, in which the solution applied to the film at the first chamber is a developing solution and that applied at the second chamber is a fixing solution, and including means for adjustably mounting one of said first two chambers so that it can be moved around said drum toward and from the other to vary the time to which the film is subjected to a developing action; means including a reversible electric motor for adjusting said adjustable chamber in either of two directions; means including a photoelectric cell for continually measuring the density of the processed film as it leaves said processing stages; and control means connected to said motor and the output of said photoelectric cell for automatically starting said motor when the film density varies from a given value and instigating the proper direction of drive thereof to shift the developing chamber in the proper direction to bring said film density back to the given value.

8. A continuous film processing machine comprising in combination a rotatable drum, means for feeding a film strip to be processed onto the periphery of said drum and holding it in wrapped relation with a portion of the periphery thereof and with the emulsion side of the film facing outwardly; a take-up roll for receiving the processed film directly from the drum; means for rotating said drum and take-up roll to advance the film through different stages of processing and reeling it up after processing; means disposed around the periphery of said drum for subjecting the emulsion surface of the film while on the drum to successive treatment of different solutions necessary to the processing of the film, said means including a plurality of similar stationary open-ended chambers displaced from one another around the drum, a block of porous material in the open end of each chamber through which a liquid may filter, and having an arcuate front face concentric with and slightly spaced from the emulsion surface of the film strip on the drum to form in combination therewith a narrow restricted passage; the rear face of each block communicating with the interior of the chamber with which it is associated; means for continually supplying under pressure a developing solution to the first of said chambers, fixing solution to an intermediate one of said chambers and water to the last of said chambers, whereby said liquids filter through said blocks and are uniformly dispersed from the front face thereof to keep said restricted passages filled with constantly renewed liquids; and thermostatically controlled means in each of said developing and fixing chambers for heating the solutions therein to a given elevated temperature immediately prior to their being introduced into the restricted passages for treating the film.

9. A continuous film-processing machine comprising in combination a plurality of spaced rotatable film-supporting rolls over which a film strip to be processed is successively passed with its emulsion surface facing the rolls, the periphery of each roll cut away to form two marginal film-engaging surfaces which engage the film only at its edges and to form a shallow recess opposite the exposed area of the film which in combination with the surface of the film constitutes a shallow channel; a pair of guide rollers adjacent, and displaced from one another around, the periphery of each of said rolls to hold the film strip in wrapped relation with a portion of each roll; means for rotating each of said rolls at a constant rate to advance the film strip from one to the other; means for continually introducing a solution into the channel formed between the bottom of the recess in said first roll and the film surface at the point where the film engages said roll and in a volume sufficient to keep said channel full so that the emulsion surface of the film will be in contact therewith so long as it is wrapped on said roll; means for removing the free developing solution from the surface of the film as it leaves said first roll and before it reaches the next roll; means for continually introducing a fixing solution into the channel formed between the bottom of the recess in a succeeding roll and the film surface at the point where the film engages said roll and in a volume sufficient to keep said channel filled; means for removing the free fixing solution from the surface of the film as it leaves said roller; and means for continually introducing water into the channel formed between the bottom of the recess in said last roll and the film surface at a point where the film engages said roll and in a volume sufficient to keep said channel filled; means for drying said film after it leaves said last roll; and means for reeling said film up on a take-up reel just as soon as it is dry.

10. A film-processing machine, according to claim 9, including means for adjustably mounting the guide roller at the leaving side of said first film-supporting roll so that it can be adjusted around to periphery of said roll to vary the degree of wrap of the film with said roll and hence the developing time to which the film is subjected; and means for adjusting the position of said guide roller around said roll in accordance with a change in density of said processed film from a given or standard density value.

11. A film-processing machine, according to claim 9, including means for adjustably mounting the guide roller at the leaving side of said first film-supporting roll so that it can be adjusted around the periphery of the roll to vary the degree of wrap of the film with said roll and hence the developing time to which the film is subjected; means for adjusting the position of said guide roller and including a reversible electric motor; means including a photoelectric cell for continually scanning the film leaving said first roll and measuring the density thereof; and a control means operating in response to the output from said photoelectric cell to start said motor when the density of the film deviates from a standard value and to cause the same to drive in the proper direction to alter the developing time of the film in a manner to compensate for deviation of the film density from said standard value.

12. In a film-processing machine the combination of a stationary hollow drum; a pair of rollers rotatably mounted on the axis of said drum adjacent opposite ends of said drum and having a diameter slightly larger than said drum; means for holding a film strip to be processed in wrapped relation with a portion of the circumference of said rollers so that the margins of said film engage said rollers and the exposed emulsion surface of the film faces and is slightly spaced from the surface of said drum; at least a part of that portion of the drum adapted to be wrapped by the film being composed of a porous material through which a processing solution can filter to be uniformly dispersed over the outside face thereof; means for continually feeding a processing solution into the interior of said drum, whereby it filters through the porous portion thereof to fill the space between the surface of the drum and the emulsion surface of the film; and means for advancing said film strip around said drum at a constant rate commensurate with a desired developing time for the film.

13. A film processing machine comprising in combination a rotatable film-supporting drum; means for directing an exposed film strip onto the periphery of said drum and holding it in wrapped relation with a portion thereof in a taut, flatwise condition with the exposed portion of the emulsion surface of the film free from contact with the periphery of said drum; a stationary wall having a front face at least as wide as the exposed portion of the emulsion surface of said film disposed adjacent and concentric to at least a part of that portion of said drum periphery engaged by said film and adapted to be slightly spaced from the exposed portion of said emulsion surface to form in combination therewith a narrow passage of finite length having an entrance end and an exit end determined by the points where the film aproaches and leaves, respectively, said wall and to be filled with a processing solution; said stationary wall comprising a material sufficiently porous to allow processing solution applied to the rear face thereof under pressure to filter therethrough and be uniformly dispersed over the entire area of the front face thereof; means for continually supplying a processing solution to the rear face of said wall under pressure at a rate commensurate with the rate at which the solution leaves said passage, whereby the emulsion surface of the film carried by the drum is wet by the solution while traversing said passage; means for rotating said drum to advance the film at a known rate through the processing solution; and means immediately adjacent the exit end of said passage for removing the processing solution from the surface of the film as it leaves said passage in order to control the processing time.

14. A continuous film processing apparatus comprising in combination a movable film support; means for directing an exposed film strip onto said film support and holding it in a taut, flatwise condition thereon with the exposed portion of the emulsion surface free from contact therewith; means for moving said film support at a desired constant rate to advance said film strip; means for continually supplying a developing solution to the emulsion surface of said film in a uniform, thin film while carried by said support; said means comprising a stationary block of material inert to said solution and sufficiently porous to permit the solution to filter therethrough, and having an exit face conforming to the shape of the film support and slightly spaced from the emulsion surface of said film supported thereon to form a narrow passage in combination therewith; means for continually supplying the developing solution under pressure to a surface of said block remote from said exit face, whereby said solution filters through said block and issues from the exit face thereof in a uniform manner over the entire area of said face to form a thin film of solution filling said passage between said block and emulsion surface of the film; and means for applying a second solution to said film strip to stop the action of said developing solution, and comprising a second block of porous material similar in form and disposition relative to the emulsion surface of the film as said first-mentioned block while it is held on said support to form a narrow passage between its exit face and the emulsion surface of the film; means for continually supplying the second solution under pressure to a surface of said second block remote from its exit face to keep said passage formed by its exit face and the emulsion surface of the film filled with solution, said second block displaced from said first block along the film path and in the direction of travel of the film to give the desired developing time.

15. A continuous film processing apparatus comprising in combination a movable film support; means for directing an exposed film strip onto said film support and holding it in a taut, flatwise condition thereon with the exposed portion of the emulsion surface free from contact therewith; means for moving said film support at a desired constant rate to advance said film strip; means for continually supplying a developing solution to the emulsion surface of said film in a uniform, thin film while carried by said support; said means comprising a stationary block of material inert to said solution and sufficiently porous to permit the solution to filter therethrough, and having an exit face conforming to the shape of the film support and slightly spaced from the emulsion surface of said film supported thereon to form a narrow passage in combination therewith; means for continually supplying the developing solution under pressure to a surface of said block remote from said exit face, whereby said solution filters through said block and issues from the exit face thereof in a uniform manner over the entire area of said face to form a thin film of solution filling said passage between said block and emulsion surface of the film; and means for applying a second solution to said film strip to stop the action of said developing solution, and comprising a second block of porous material similar in form and disposition relative to the emulsion surface of the film as said first-mentioned block while it is held on said support to form a narrow passage between its exit face and the emulsion surface of the film; means for continually supplying the second solution under pressure to a surface of said second block remote from its exit face to keep said passage formed by its exit face and the emulsion surface of the film filled with solution, said second block displaced from said first block along the film path and in the direction of travel of the film to give the desired developing time; and means for adjusting the relative positions of the first and second blocks along the film path to vary the developing time of the film.

16. A continuous film processing apparatus comprising in combination a movable film support; means for directing an exposed film strip onto said film support and holding it in a taut, flatwise condition thereon with the exposed portion of the emulsion surface free from contact therewith; means for moving said film support at a desired constant rate to advance said film strip; means for continually supplying a developing solution to the emulsion surface of said film in a uniform, thin film while carried by said support; said means comprising a stationary block of material inert to said solution and sufficiently porous to permit the solution to filter therethrough, and having an exit face conforming to the shape of the film support and slightly spaced from the emulsion surface of said film supported thereon to form a narrow passage in combination therewith; means for continually supplying the developing solution under pressure to a surface of said block remote from said exit face, whereby said solution filters through said block and issues from the exit face thereof in a uniform manner over the entire area of said face to form a thin film of solution filling said passage between said block and emulsion surface of the film; and means for applying a second solution to said film strip to stop the action of said developing solution, and comprising a second block of porous material similar in form and disposition relative to the emulsion surface of the film as said first-mentioned block while it is held on said support to form a narrow passage between its exit face and the emulsion surface of the film; means for continually supplying the second solution under pressure to a surface of said second block remote from its exit face to keep said passage formed by its exit face and the emulsion surface of the film filled with solution, said second block displaced from said first block along the film path and in the direction of travel of the film to give the desired developing time; means for continually measuring the optical density of the film being processed; means for adjusting the relative positions of the first and second blocks along the film path to vary the developing time of the film; and means for operating said last-mentioned means in the proper direction in response to said density measuring means to obtain a processed film having a given density.

OLIVER J. WAMPOLE.
FORDYCE M. BROWN.
CLIFTON M. TUTTLE.

REFERENCES CITED

The following references are of record in the file of this patent:

UNITED STATES PATENTS

| Number | Name | Date |
|---|---|---|
| 1,303,837 | Wyckoff et al. | May 13, 1919 |
| 1,751,881 | Pifer | Mar. 25, 1930 |
| 1,927,836 | Burns et al. | Sept. 26, 1933 |
| 1,928,235 | Taylor | Sept. 26, 1933 |
| 1,959,233 | Franke | May 15, 1934 |
| 2,240,409 | Morse | Apr. 29, 1941 |
| 2,289,753 | Capstaff | July 14, 1942 |
| 2,296,048 | Planskoy | Sept. 15, 1942 |
| 2,446,668 | Tuttle et al. | Aug. 10, 1948 |
| 2,492,133 | Cobb | Dec. 27, 1949 |

FOREIGN PATENTS

| Number | Country | Date |
|---|---|---|
| 126,414 | Germany | Dec. 31, 1901 |
| 695,570 | Germany | Aug. 28, 1940 |
| 387,781 | Great Britain | Feb. 16, 1933 |
| 423,857 | Great Britain | Feb. 11, 1935 |